US010809956B1

(12) United States Patent
Bragdon et al.

(10) Patent No.: US 10,809,956 B1
(45) Date of Patent: Oct. 20, 2020

(54) SUPPLEMENTAL CONTENT ITEMS

(71) Applicant: Pinterest, Inc., San Francisco, CA (US)

(72) Inventors: Andrew Craig Bragdon, Brentwood, CA (US); Justin Velo, San Francisco, CA (US); Shahrouz Tavakoli, Pleasant Hill, CA (US); Wendy Lin Lu, San Francisco, CA (US); Mengya You, San Francisco, CA (US); Yunnan Wu, Palo Alto, CA (US); Vivian Clara Chow, San Francisco, CA (US); Mehrdad Bidgoli, San Francisco, CA (US); Raphael Grignani, San Francisco, CA (US); Nipoon Malhotra, Mountain View, CA (US); Harsh Goel, San Francisco, CA (US)

(73) Assignee: Pinterest, Inc., San Francisco, CA (US)

( * ) Notice: Subject to any disclaimer, the term of this patent is extended or adjusted under 35 U.S.C. 154(b) by 371 days.

(21) Appl. No.: 15/354,919

(22) Filed: Nov. 17, 2016

(51) Int. Cl.
*G06F 3/14* (2006.01)
*G06F 3/0484* (2013.01)

(52) U.S. Cl.
CPC ............ *G06F 3/14* (2013.01); *G06F 3/04842* (2013.01)

(58) Field of Classification Search
None
See application file for complete search history.

(56) References Cited

U.S. PATENT DOCUMENTS 6,502,076 B1 * 12/2002 Smith .................... G06Q 30/02 705/14.54
7,975,019 B1 * 7/2011 Green ................ G06Q 30/0241 705/14.4
9,032,066 B1 * 5/2015 Erdmann ................ G06F 21/53 709/224
9,565,233 B1 * 2/2017 Ozuysal .............. H04L 67/2842
9,785,969 B1 * 10/2017 Boynes .............. G06Q 30/0255
9,965,526 B1 * 5/2018 Chanda .................. G06Q 50/01
10,002,373 B1 * 6/2018 Voskamp ........... G06Q 30/0601
2004/0194103 A1 * 9/2004 Wang ..................... G06O 30/02 718/100
2004/0205514 A1 * 10/2004 Sommerer ............ G06F 17/212 715/205

(Continued)

*Primary Examiner* — Howard Cortes
(74) *Attorney, Agent, or Firm* — Athorus, PLLC

(57) ABSTRACT

Disclosed are systems and methods for presenting supplemental content items on a user device while requested additional content is obtained. For example, a user is presented with a content item, such as an image, an advertisement, etc., on a display of a user device. The content item, when interacted with by the user, results in a request for additional content, such as a web page, being sent to a remote computing resource, the additional content item being received by the user device from the remote computing resource, loaded by the user device, and presented to the user on the display of the user device. Rather than presenting the user with a blank screen, an empty window, a “loading” notification (e.g., spinning icon), etc., while the additional content item is retrieved and loaded, the implementations discussed herein provide the user with effectively instant gratification by presenting on the display of the user device and while the additional content item is retrieved and loaded, supplemental content that is already stored in memory of the user device.

22 Claims, 10 Drawing Sheets

(56) References Cited

U.S. PATENT DOCUMENTS

2006/0069617 A1* 3/2006 Milener ............ G06F 17/30902 705/14.69
2006/0070012 A1* 3/2006 Milener ................ G06F 3/0482 715/822
2007/0282906 A1* 12/2007 Gabriel .................. G06Q 30/02
2008/0004891 A1* 1/2008 Bostwick ........... G06Q 30/0603 705/1.1
2008/0163071 A1* 7/2008 Abbott ................... G06Q 30/02 715/748
2008/0235594 A1* 9/2008 Bhumkar .......... G06F 17/30991 715/738
2008/0282196 A1* 11/2008 Park .................. H04M 1/72544 715/838
2009/0132377 A1* 5/2009 Thompson ............. G06Q 30/02 705/14.69
2010/0107188 A1* 4/2010 van Hoff .............. G11B 27/034 725/32
2010/0169766 A1* 7/2010 Duarte ................ G06F 3/04842 715/244
2011/0035275 A1* 2/2011 Frankel ................. G06F 3/0481 705/14.45
2012/0310731 A1* 12/2012 Li .......................... G06O 30/02 705/14.45
2013/0204695 A1* 8/2013 Lee ........................ G06Q 30/00 705/14.45
2014/0019868 A1* 1/2014 Varian ............... G06F 17/30864 715/738
2014/0136313 A1* 5/2014 Shaw ................. G06O 30/0246 705/14.41
2014/0136971 A1* 5/2014 Kumar .............. G06F 17/30902 715/273
2014/0258834 A1* 9/2014 Brown ................ G06F 17/2247 715/234
2014/0280677 A1* 9/2014 Altman ............... H04L 67/2847 709/213
2015/0033104 A1* 1/2015 Zhang ............... G06F 17/30873 715/205
2015/0143413 A1* 5/2015 Hall ................... G06Q 30/0271 725/34
2015/0154659 A1* 6/2015 Harrison ............ G06Q 30/0277 705/14.73
2015/0248721 A1* 9/2015 Brown ............... G06Q 30/0631 705/26.7
2016/0124924 A1* 5/2016 Greenberg .......... G06F 17/2247 715/738
2017/0061493 A1* 3/2017 Grundfast .......... G06Q 30/0267
2017/0279870 A1* 9/2017 Hansen ................... H04L 67/06
2017/0323328 A1* 11/2017 Nam .................. G06Q 30/0241
2018/0004753 A1* 1/2018 Chatterjee ............... H04L 67/02

* cited by examiner

MANAGEMENT SERVICE 103
101-1(1)
101-1(2)
101-1(N)
COMPUTER RESOURCE(S) 101-1
REQUEST/ RECEIVE CONTENT ITEM
MEMORY 104
SUPPLEMENTAL CONTENT 112
100-1
102-1
102-2
102-N
Store A Home Improvement
CONTENT ITEMS
101-2(1)
101-2(2)
101-2(N)
COMPUTER RESOURCE(S) 101-2
REQUEST ADDITIONAL CONTENT ITEM
ADDITIONAL CONTENT ITEM
105
100-2
112-2
Store A Home Improvement
SUPPLEMENTAL CONTENT ITEM
100-3
113
Store A
Home Improvement
Shop
Discount %
ADDITIONAL CONTENT ITEM

SUPPLEMENTAL CONTENT ITEMS

BACKGROUND

Social media, the Internet, and web pages have changed the way people access information, and how advertisements are presented. In addition, our society has become accustomed to effectively instant gratification and are often not willing to wait for content to load when accessing digital information. For example, users are often only willing to wait one to two seconds after selecting a website for that website to load. If it takes longer for the content to be loaded and presented to the user, the user will often abandon the page and browse to other materials. This instant expectation is also prevalent when users select to view additional information relating to advertisements, videos, or other content accessible from web pages, applications, etc. However, webpages and other content take, on average, approximately eight seconds to load. As a result, users often abandon viewing selected content because they are unwilling to wait for that content to load.

Many companies are attempting to resolve this problem by developing new programming languages and/or techniques for developing Internet web pages, altering the server infrastructure used to deliver content, etc. However, those modifications will take time and extensive resources to implement. Likewise, those modifications do not resolve the potential delay that may be experienced due to slow connectivity speeds or other activities that are out of the control of the content provider.

BRIEF DESCRIPTION OF THE DRAWINGS

The detailed description is set forth with reference to the accompanying figures.

DETAILED DESCRIPTION

This disclosure describes systems and methods for presenting supplemental content items on a user device while requested additional content is obtained. For example, a user is presented with a content item, such as an image, an advertisement, etc., on a display of a user device. The content item, when interacted with by the user, results in a request for additional content, such as a web page, being sent to a remote computing resource, the additional content item being received by the user device from the remote computing resource, loaded by the user device, and presented to the user on the display of the user device. Rather than presenting the user with a blank screen, an empty window, a "loading" notification (e.g., spinning icon), etc., while the additional content item is retrieved and loaded, the implementations discussed herein provide the user with effectively instant gratification by presenting on the display of the user device and while the additional content item is retrieved and loaded, supplemental content that is already stored in memory of the user device.

In one implementation, when the content item is delivered to the user device, the supplemental content item is provided with the content item and stored in a memory of the user device in the event the content item is interacted with. When and if the content item is interacted with by the user, the user device presents the stored supplemental content item and requests the additional content item from the remote computing resource referenced by the content item. When the additional content item is received and loaded by the user device, the presentation of the supplemental content item is replaced with a presentation of the additional content item.

Figure 1:
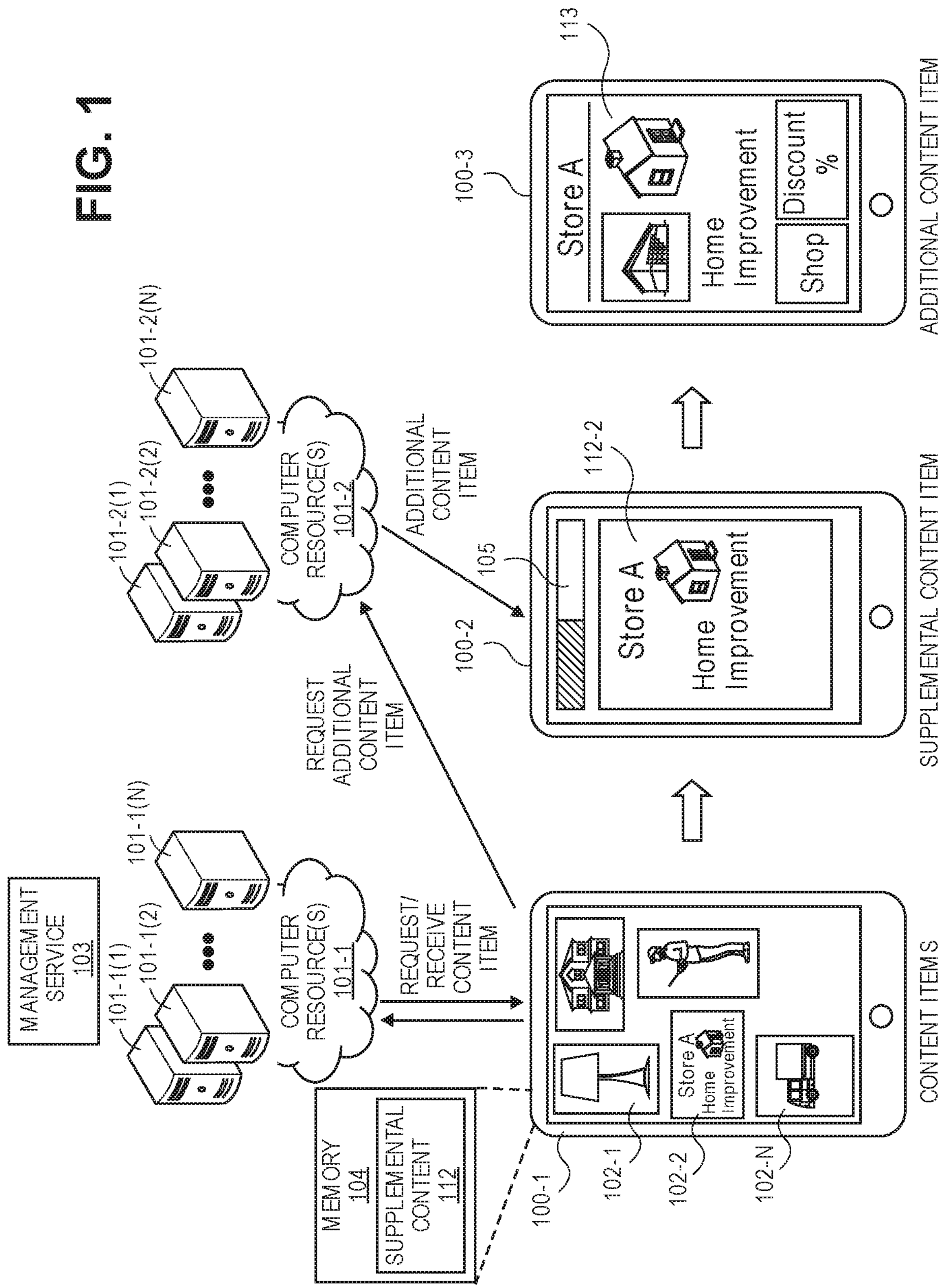
FIG. 1 is a pictorial diagram illustrating an example transition between graphical interfaces illustrating the presentation of a supplemental content item while an additional content item is obtained, in accordance with implementations of the present disclosure.

FIG. 1 is a pictorial diagram of a transition between graphical interfaces of presented content illustrating the presentation of a supplemental content item while an additional content item is retrieved and loaded, in accordance with implementations of the present disclosure. In this example, the user device 100 is running an application in which content items, supplemental content items, and/or additional content items are presented on a display of the user device. It will be appreciated that the implementations discussed herein are equally applicable to any combination of applications, user interfaces, operating systems, etc.

At an initial point, the user device 100-1 requests from a first remote computing resource 101-1 a request for one or more content items 102. The first remote computing resource 101-1, upon receipt of the request, provides the requested content items 102 to the user device 100-1, and the user device 100-1 presents the content items 102 on the display of the user device 100-1. The first remote computing resource may include a management service 103 that stores the content items, supplemental content items, maintains user information, and provides content items and associated supplemental content item in response to a request for content items. The management service 103 is discussed further below.

The first remote computing resources 101-1, and the second remote computing resource 101-2, discussed below, may form a portion of a network-accessible computing platform implemented as a computing infrastructure of processors, storage, software, data access, and other components that is maintained and accessible via a network. Services, such as the management service 103 offered by the remote computing resources 101-1, do not require that the user have knowledge of the physical location and configuration of the system that delivers the services. Devices, such as the user device 100, may communicatively couple to the remote computing resources 101-1 and/or 101-2 via a network, which may represent wired technologies (e.g., wires, USB, fiber optic cable, etc.), wireless technologies (e.g., RF, cellular, satellite, Bluetooth, etc.), and/or other connection technologies. The network carries data between the devices 100 and the remote computing resources 101-1, 101-2, etc. and/or the management service 103. For example, the network may carry data representative of content item request, the content item, an additional content item request, and/or the additional content item, as discussed further below.

As illustrated, the remote computing resources 101-1, 101-2 may include one or more servers, such as servers 101-1(1), 101-1(2), . . . , 101-1(N) of remote computing resource 101-1, and servers 101-2(1), 101-2(2), . . . , 101-2(N). These servers may be arranged in any number of ways, such as server farms, stacks, and the like that are commonly used in data centers. Furthermore, as illustrated below with respect to FIG. 11, the servers may include one or more processors and memory which may store the management service 103 and execute one or more of the processes or features discussed herein.

The management service 103 may be, for example and without limitation, a social networking provider, an electronic commerce provider, etc. For example, when a user opens or executes a social networking application on the user device 100-1, the social network application may send a request to the management service 103 and/or the first remote computing resources 101-1 for content items to present to the user. The content items may be selected using any of a variety of techniques. For example, the content items may be associated with the user, of interest to the user, randomly selected, based on a search request of the user, etc. Likewise, any number, size, shape, and/or type of content items 102-1, 102-2 . . . 102-N may be retrieved from the management service 103 and/or the first remote computing resource 101-1 and presented by the user device 100.

In the example illustrated with respect to FIG. 1, the user has requested content items related to home improvement. The content items 102, in this example, include images, video, and/or advertisements potentially related to home improvement. Likewise, as discussed further below, some or all of the content items 102 may include links, such as uniform resource locators (URL) to additional content items that are stored and accessible from the first remote computing resource 101-1 or from other remote computing resources. For example, the content item 102-1 may include a link to additional content maintained by the first remote computing resource 101-1 and the second content item 102-2 may include a link to a web page (additional content item) of Store A that is maintained and accessible from a second remote computing resource 101-2 that is distinct and independent from the first remote computing resources 101-1.

Additional content items, as used herein, may be any digital content that can be referenced by a link or other data of a content item, requested, and retrieved from a resource that is remote from the user device. For example, an additional content item may be an image, a webpage, a video, etc., that is referenced by a content item and retrievable from a resource that is not the user device.

A user may view and/or interact with any of the content items 102 presented on the display of the user device 100-1. In this example, the user interacts with, by selecting using a touch-based display, the content item 102-2, which is an advertisement for store A that provides home improvement. In response to receiving an interaction from the user, the user device 100-1 requests from the second remote computing resource 101-2 the additional content item referenced by the content item 102-2 and presents to the user the supplemental content item 112-2 that was stored in the memory 104 as supplemental content 112. The supplemental content item is presented, as illustrated by user device 100-2. In some implementations, in addition to presenting a supplemental content item 112-2, the user device 100-2 may also present a loading indicator 105 to provide an indication to the user that supplemental content item 112-2 is being presented while the referenced additional content is retrieved and loaded.

Supplemental content may be any form of content that is presentable by the user device. For example, the supplemental content may be an image of the content item, an image of the additional content item, a video, an advertisement, information about the content item, information about the additional content item, an interactive object, an animation, etc. In this example, the presented supplemental content item 112-2 is a detailed and larger image of the content item 102-2 that is presented on the display of the user device 100-2 while the referenced additional content item is retrieved from the second remote computing resource 101-2.

When the additional content item has been received from the second remote computing resource (or other location) and loaded by the user device, the presentation of the supplemental content item is replaced with the additional content item, as illustrated by user device 100-3. In this example, the additional content item referenced by the content item 102-2 is a webpage for Store A which is requested from the second remote computing resource 101-2 and sent to the user device 100. The user device, upon receipt of the web page contents, loads the web page and, once loaded, presents the web page 113 on the display of the user device such that the presentation of the web page 113 replaces the presentation of the supplemental content.

Using the implementations discussed herein, as illustrated by the example discussed with respect to FIG. 1, provides effectively instant gratification to the user by presenting content to the user that is relevant to a content item selected by the user while the additional content item referenced by the selected content item is retrieved from a remote computing resource and loaded for presentation by the user device. Providing the supplemental content to the user while the referenced additional content is retrieved and loaded reduces the likelihood that the user will abandon the request for the additional content due to the delay between interacting with the content item to request the additional content item and actual presentation of the additional content item.

Figure 2:
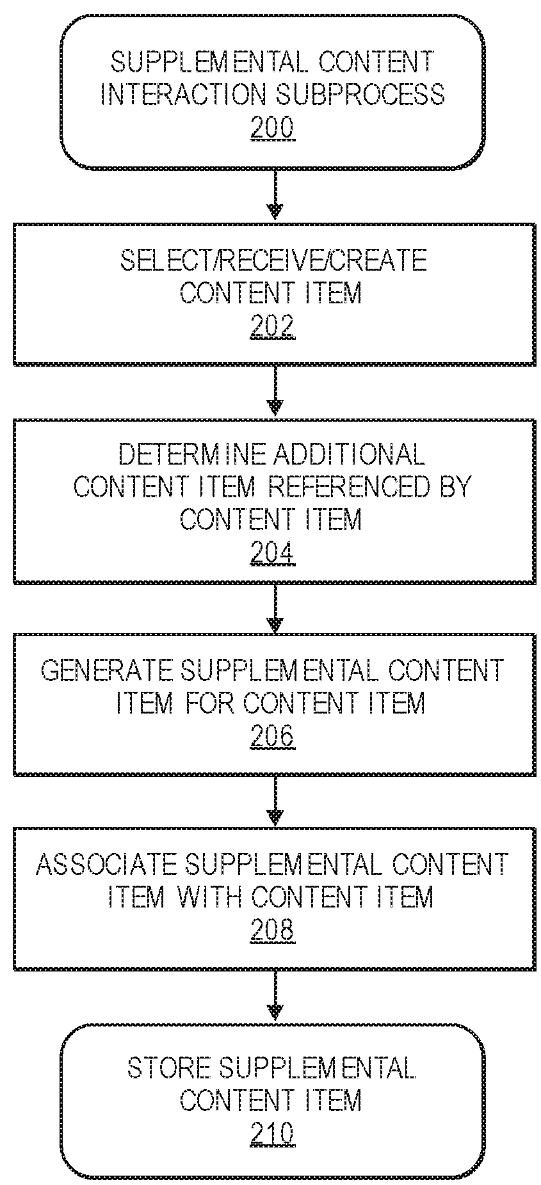
FIG. 2 is a flow diagram illustrating an example supplemental content creation process, in accordance with implementations of the present disclosure.

FIG. 2 is a flow diagram illustrating an example supplemental content item creation process 200, in accordance with implementations of the present disclosure. The example process 200, which may be performed by a management service, such as the management service 103 discussed above with respect to FIG. 1, begins by selecting, receiving, or creating a content item that is maintained by the management service, as in 202. Content items may be formed from a variety of sources. For example, a user of the service may upload content items in the form of images, video, etc. Some or all of those content items may include a link (e.g., URL) or other reference to additional content maintained by the management service, or maintained at another remote computing resource.

As another example, content items may already be stored in a data store of the management service and those content items may be periodically selected so that a supplemental content item can be created and associated with that content item or, if a supplemental content item is already associated, the supplemental content item may be updated. In one example, the management service may automatically update supplemental content items on a periodic basis (e.g., every hour, every day, every week) for each content item that includes a reference to an additional content item. In another example, a frequency with which the referenced additional content item changes may be determined. Based on the frequency with which the additional content item changes, an update frequency indicating how often the supplemental content item associated with the content item that references the additional content item may be determined and the supplemental content item may be periodically updated based on that frequency. In one example, if the additional content item is a web page, it may be determined how frequently the additional content item (the web page) changes. Based on the determined frequency, an update frequency may be determined indicating a frequency with which the supplemental content item is to be updated.

As still another example, the management service may create content items that reference additional content items. For example, the management service may create a content item that references another webpage, or another group of content items.

Regardless of the source of the content item, the additional content item referenced by the content item is determined, as in 204. For example, the example process 200 may request the additional content item based on the reference included with the content item. In another example, the content item may include other metadata that indicates the additional content item. In still other examples, the example process may omit step 204.

As part of the example process 200, a supplemental content item is generated for the content item, as in 206. The supplemental content item may be, for example, an image of the additional content item, an image of the content item, additional information about the content item and/or the additional content item, an advertisement, a video, etc. In one implementation, if the additional content item is a webpage, the example process may request the webpage and generate an image (e.g., .gif, .jpg, .bmp) of the web page and that image of the webpage may be maintained as the supplemental content item. As another example, the source of the content item may provide a specific supplemental content item. In still another example, the supplemental content item may be formed from the content item. For example, if the content item is an image or a video advertisement, the supplemental content item may include a larger and/or more detailed image of the content item, a short or expanded version of the video advertisement, etc.

The generated supplemental content item is then associated with the content item, as in 208. As discussed below, when a content item is requested by a user device, the supplemental content item is sent along with the content item and maintained in memory of the user device. Associating the supplemental content item may include, for example, including a reference identifier with the content item and/or the supplemental content item indicating the association, relating the content item and the supplemental content item in a data store, including the supplemental content item in a metadata of the content item, etc.

Finally, the supplemental content item is stored in a data store of the management service, as in 210. The supplemental content item may be stored in a same data store as the content item and/or in a separate data store.

While the above example discusses associating a single supplemental content item with a single content item, in other implementations, multiple supplemental content items may be associated with the same content item and/or multiple content items may be associated with the same supplemental content item. For example, a content item may include a first supplemental content item in the form of a video and a second supplemental content item in the form of a digital image. When the content item is requested, one or both of the supplemental content items may be sent to the requesting user device, along with the requested content item. If one of the supplemental content items is sent, it may be randomly selected, selected based on user preference, selected based on connectivity and/or type of connection with the user device, etc. If multiple supplemental content items are sent to the user device with the requested content item, if a supplemental content item is presented, as discussed below, one of the supplement content items may be selected based on a variety of factors. For example, the user device may randomly select one of multiple content items associated with the content item, may select a supplemental content item based on user device capabilities, user preference, etc.

Figure 3:
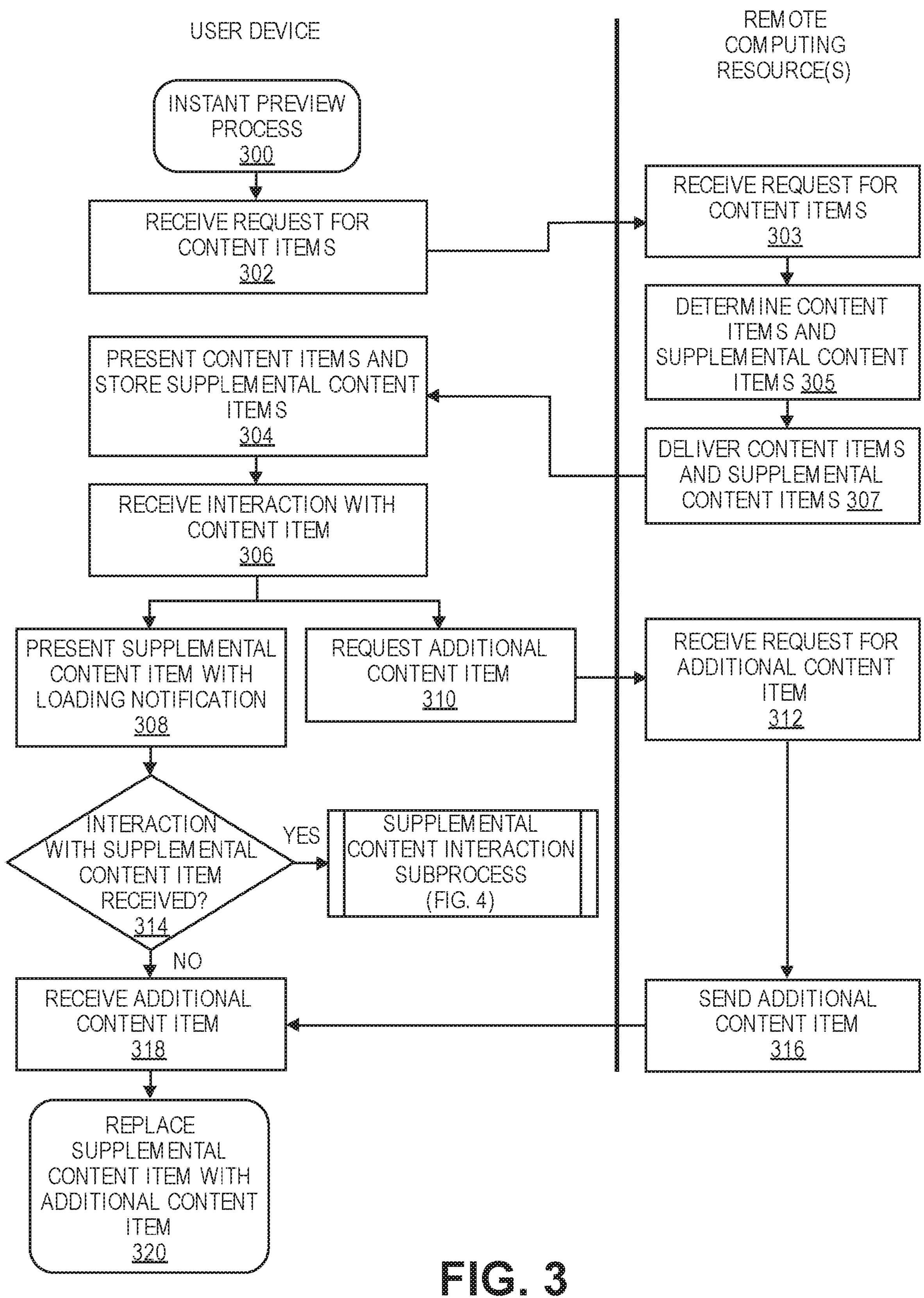
FIG. 3 is a flow diagram illustrating an example instant preview process, in accordance with implementations of the present disclosure.

FIG. 3 is a flow diagram illustrating an example instant preview process 300, in accordance with implementations of the present disclosure. The example process 300 begins upon receipt by a user device of a request for one or more content items, as in 302. The request may be, for example, a user requesting to view content items, a user launching or executing an application that presents content items to the user on a display of the user device, an application requesting an update to content items that may be presented on the display of the user device, etc.

Upon receiving a request for one or more content items, the request is sent to the management service at a first remote computing resource, as in 303. The request for content items may be sent in any format that can be received by the management service, or other entity. For example, the request for content items may be a fixed data structure. Upon receipt by the management service, content items and associated supplemental content items are determined that are responsive to the request, as in 305. For example, if the request for content items identifies a type of content items and/or a topic of interest (e.g., home improvement), content items corresponding to the request are selected.

If a selected content item includes more than one associated supplemental content item, one or more of those supplemental content items are also determined as part of the example process 300. As noted above, one or more supplemental content items may be selected for a content item based on, for example, a user preference, user device type, user device capabilities, random selection, etc.

The remote computing resources and the management service send the determined content items and the associated supplemental content item(s) to the user device that requested the content items, as in 307. Upon receipt by the user device of the content items and the associated supplemental content items, the content items are presented to the user via a display of the user device and the supplemental content items are stored in a memory of the user device, as in 304. For example, the supplemental content items may be cached in local memory, such as random access memory so they are quickly accessible and available for presentation.

As the content items are presented on the display of the user device, an interaction with a content item is received, as in 306. An interaction may include, for example, a user selecting a displayed content item with an input device, such as a mouse, keyboard or touch-based display. Alternatively, gaze tracking may be implemented by the user device to track a gaze direction and/or duration of the user when viewing the content items. If the user gazes at a content item for a defined period of time (e.g., 5 seconds), the gaze may function as an interaction with the content item.

Upon receipt of an interaction with a content item, the supplemental content item associated with that content item, which is stored in the local memory of the user device, is presented to the user, as in 308. For example, the presented content items may be replaced with the presentation of the supplemental content item associated with the interacted with content item. In addition, a loading notification, or indicator to inform the user that the additional content referenced by the content item has been requested and will be presented to the user when available. In addition to presenting the associated supplemental content item on the display of the user device in response to an interaction with the content item, a request for the additional content item referenced in the interacted with content item is sent from the user device to a remote computing resource, as in 310, and received by the remote computing resource, as in 312. This request may be send in parallel with the presentation of the supplemental content item. Likewise, depending on the reference included in the content item, the request may be to the same remote computing resources utilized by the management service, may be directed to the management service, may be directed to another entity, and/or may be directed to a different remote computing resource. In general, the request for an additional content item need not be sent to, or in any way associated with, the management service. The remote computing resource, upon receipt of the request for the additional content item, sends the additional content item to the requesting user device, as in 316.

While the supplemental information is presented on the display of the user device, a determination is made as to whether an additional interaction by the user with the presented supplemental content item has been received, as in 314. For example, if the supplemental content item includes an image of a web page (additional content item), a user may instinctively select an object represented in the image of the additional content item. As another example, the supplemental content item may include one or more objects that may prompt a user to interact with those objects. For example, the supplemental content item may include a "Buy Now" representation in the supplemental content item that is presented to the user.

If it is determined that the user has interacted with the presented supplemental content item, the example supplemental content item interaction subprocess 400 is performed. The example supplemental content item interaction subprocess 400 is discussed below with respect to FIG. 4.

If it is determined that the user has not interacted with the presented supplemental content item, the additional content is received by the user device and loaded for presentation on the display of the user device, as in 318. Finally, the presentation of the supplemental content item is replaced with a presentation of the additional content item, as in 320. In some implementations, the transition between the presented supplemental content item and the additional content item may be seamless to the extent that it may be effectively transparent to the user. For example, if the supplemental content item is an image of a web page, which is the additional content item, when the web page is loaded and ready for presentation, it may be presented and replace the image of that webpage.

Figure 4:
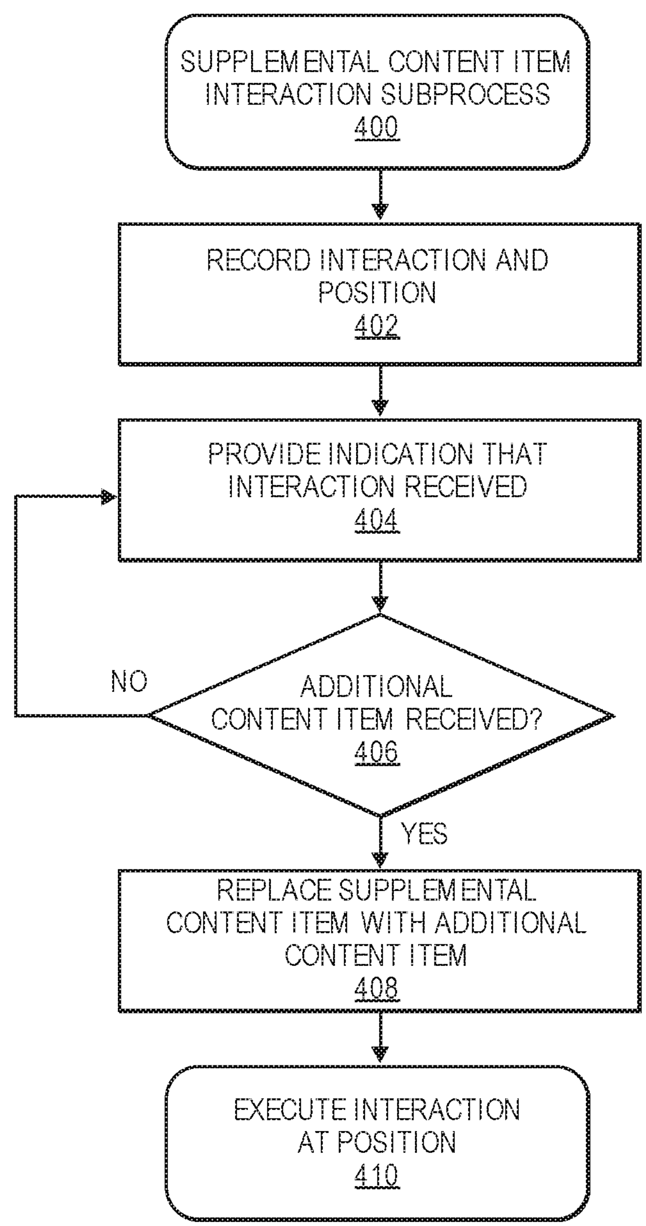
FIG. 4 is a flow diagram illustrating an example supplemental content item interaction process, in accordance with implementations of the present disclosure.

FIG. 4 is a flow diagram illustrating an example supplemental content item interaction subprocess 400, in accordance with implementations of the present disclosure. The example subprocess 400 begins by recording the interaction and the position of the interaction with the presented supplemental content item, as in 402. For example, a display may be segmented by pixels and/or according to a two-dimensional coordinate system (x, y) with each position of the display associated with a pixel position and/or an x, y position. Upon detection of an interaction, such as a touch input in a touch-based display, the position of the interaction and the interaction itself is recorded. In some implementations, other components of the interaction may likewise be recorded. For example, a pressure or force of the input, the duration of the input, the type of the input (e.g., touch, swipe, pinch) may likewise be recorded.

In addition to recording the interaction, an indicator is provided to the user as confirmation that the input with the supplemental content item has been received, as in 404. The indicator may be a visual indicator, an audible indicator, a tactile indicator, or a combination of any two or more of visual, audible, or tactile indications. In one example, upon receipt of an interaction with the presented supplemental content item, the presentation of the supplemental content item may be dimmed or partially greyed out to provide an indication that the interaction with the supplemental content item has been received.

A determination is then made as to whether the requested additional content has been received and loaded by the user device, as in 406. If it is determined that the additional content item has not been received, the example subprocess 400 returns to block 404. If it is determined that the additional content item has been received, the presentation of the supplemental content item is replaced with a presentation of an additional content item, as in 408. Finally, the recorded interaction is executed as if it were input to the additional content item, as in 410.

As an alternative to recording the interaction with the supplemental content item and then executing the recorded action upon presentation of the additional content item, the interaction may be sent to the remote computing resource from which the additional content item was received for execution. As still another example, if the supplemental content item includes objects that may be selected by the user (e.g., a buy button), one or more actions may be defined for those positions of the presented supplemental content item. In such an example, if an interaction is received at one of those defined positions of the supplemental content item, the associated action may be sent to the remote computing resource for completion.

Figure 5:
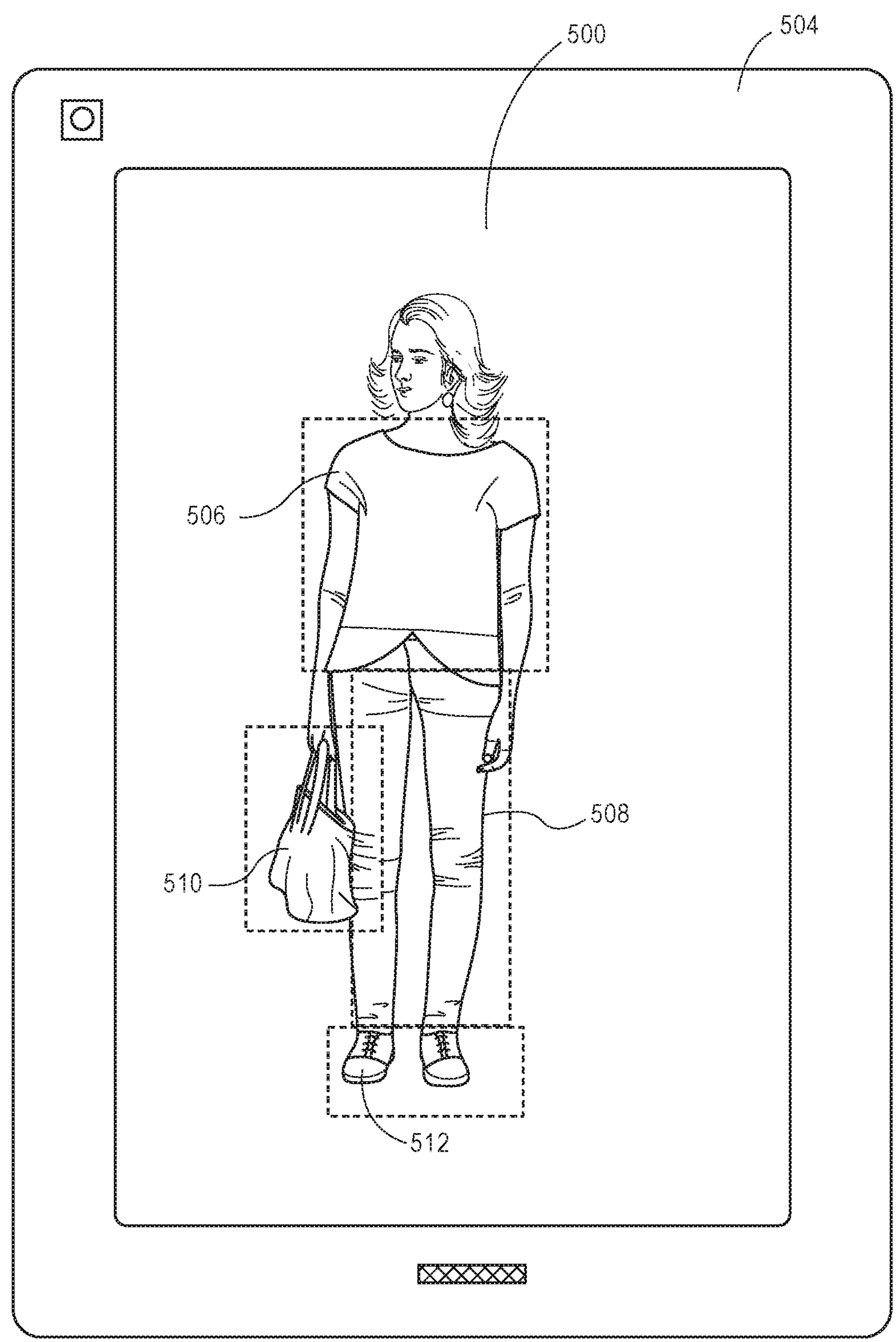
FIG. 5 is a representation of a segmented image with purchase controls associated with represented items available for purchase from one or more sellers, in accordance with implementations of the present disclosure.

FIG. 5 is a representation of a segmented image presented on a display 500 of a user device 504 in which each of the image segments is a content item that includes a reference to an additional content item that is accessible from a resource other than the user device 504, in accordance with implementations of the present disclosure. For each content item, such as the content item 506 that includes the shirt, the content item 510 that includes the purse, the content item 508 that includes the pants, and the content item 512 that includes the shoes, a reference to an additional content item is included. Likewise, when the content items were transmitted to the user device 504, one or more supplemental content items associated with each content item was also transmitted to the user device and stored in a memory of the user device 504.

A user may interact with the presented content items and optionally select one of the content items to obtain additional information about the object(s) represented in the content item and/or to purchase the object(s) represented by the content item. Rather than presenting the user with a blank screen, a loading icon, etc., while a requested additional content item is retrieved and presented, an associated supplemental content item that is already stored in the memory of the user device is presented to the user on the display of the user device. In addition, the additional content item is requested based on the reference included with the content item.

Figure 6:
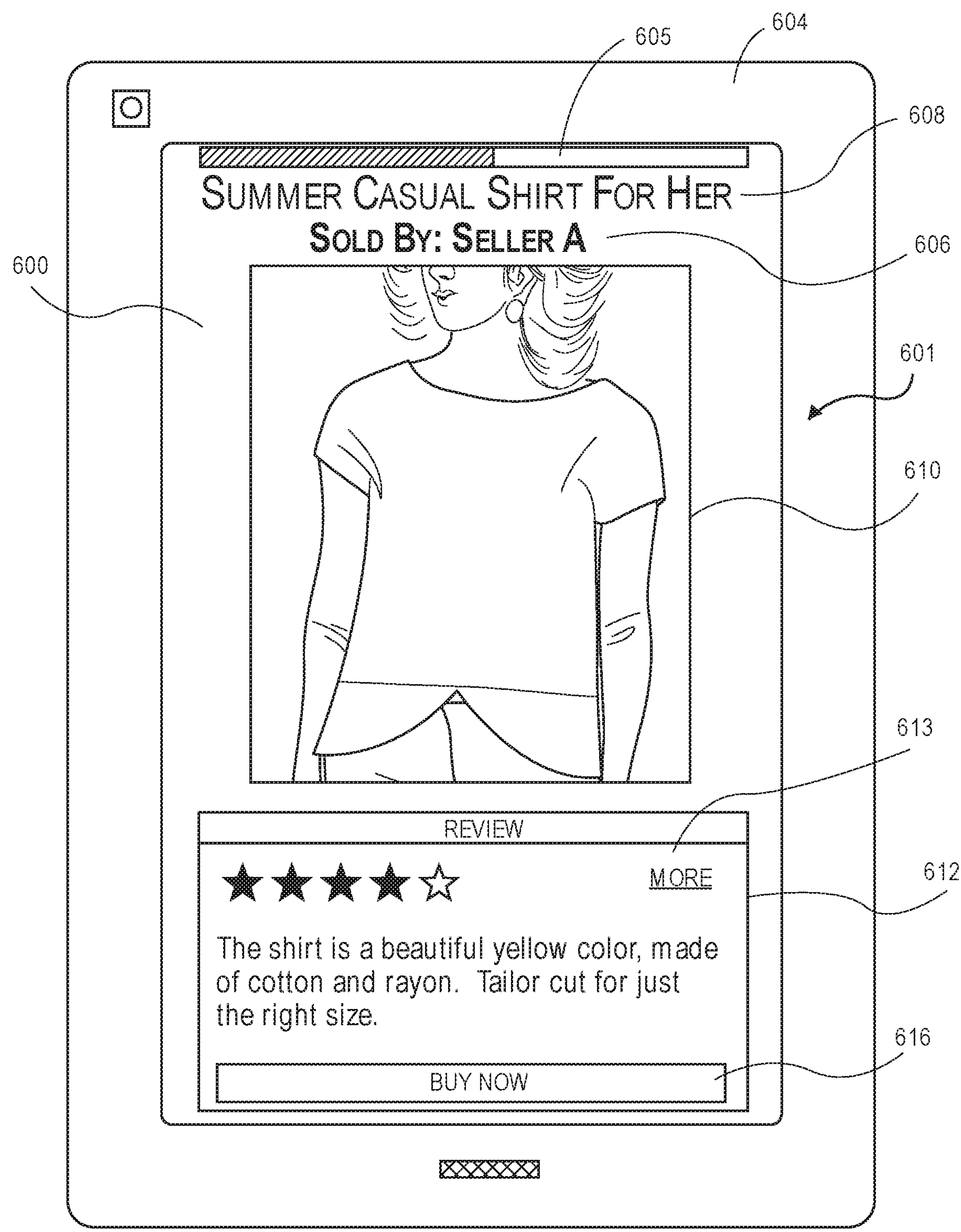
FIG. 6 is a representation of a supplemental content item presented upon selection of a content item from the representation presented in FIG. 5 and while an additional content item is obtained, in accordance with implementations of the present disclosure.

For example, FIG. 6 is a presentation of a supplemental content item that is presented on the display 600 of the user device 604 in response to a user interacting with the content item 506 (FIG. 5), in accordance with implementations discussed herein. In this example, the supplemental content item 601 includes an image 610 of the object represented in the selected content item, an identification of the seller 606 of the content item, in this example Seller A, a name 608 of the object represented in the content item, in this example "Summer Casual Short For Her," a review 612 of the content item, and an indication 605 that the additional content item is being retrieved and will be presented to the user when available. In this example, the supplemental content item also includes an interactive object 616 that is a representation of a buy button. As discussed above, the object 616 may be at a defined position on the supplemental content item and may be associated with a specific action.

Figure 7:
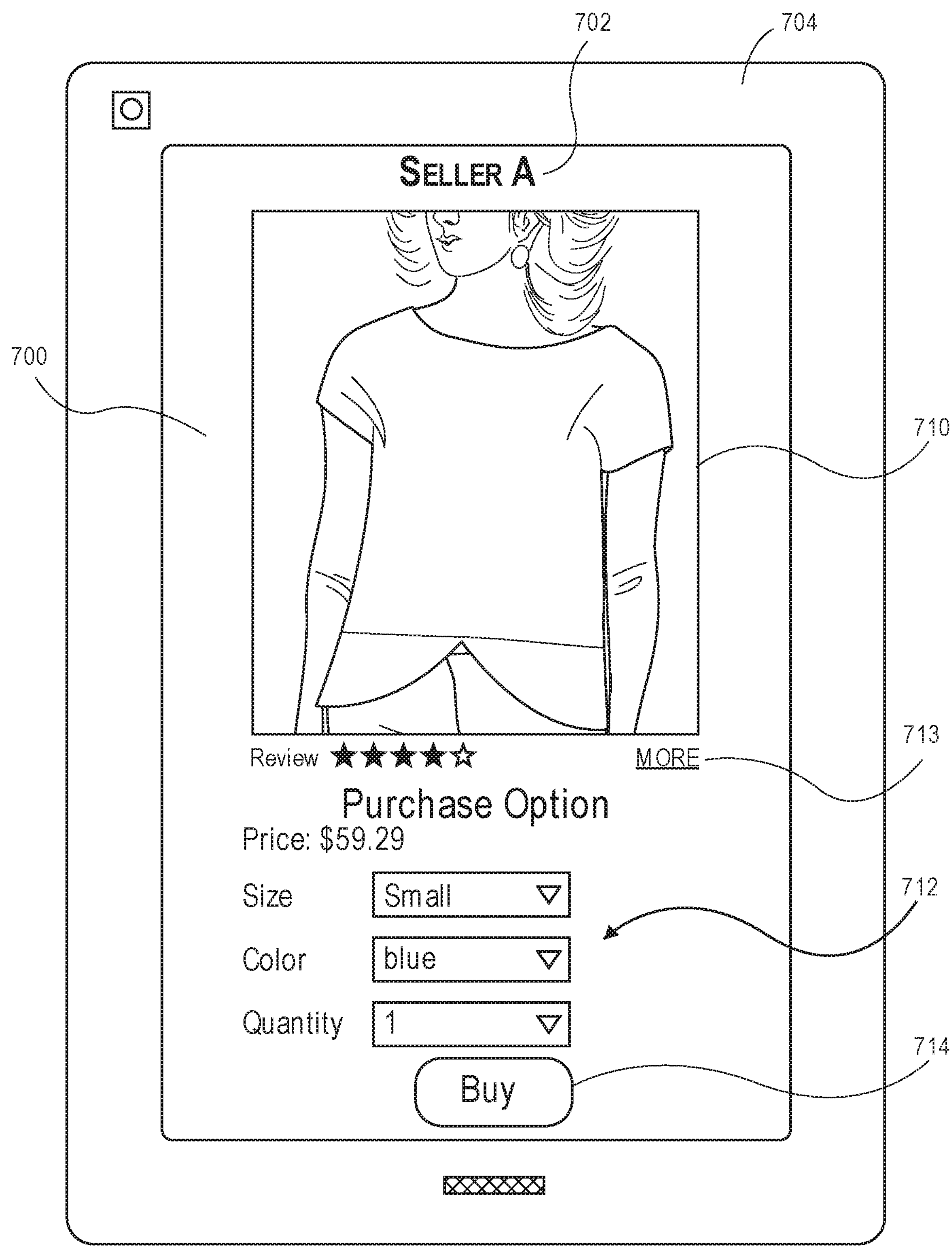
FIG. 7 is a representation of an additional content item, in accordance with implementations of the present disclosure.

The user, when presented with the supplemental content item, may view the supplemental content item to obtain additional information about the object(s) represented in the content item and/or interact with the supplemental content item. If the user does not interact with the supplemental content item, when the requested additional content item is retrieved and available, it is presented on the display 600 of the user device and replaces the presentation of the supplemental content item. In this example, the additional content item referenced by the content item 506 (FIG. 5) is a web page that provides additional information about the object represented in the content item and provides the user with purchase options and/or the option to purchase the object represented in the content item. For example, FIG. 7 is a presentation of an additional content item retrieved and presented in response to a user interacting with the content item 506 (FIG. 5), in accordance with implementations discussed in the present disclosure. In this example, the additional content item is a web page that includes an image 710 of the object, an identification of the seller 702 of the item, purchase option selection 712, and a purchase or buy control 714, that is presented on the display 700 of the user device 704 when the additional content item is retrieved and available for presentation on the user device. As will be appreciated, the additional content item may be any form of content and the web page presented with respect to FIG. 7 is just one example and should not be considered limiting.

Referring back to FIG. 6, if the user interacts with the presented supplemental content item, the interaction and the position of the interaction may be recorded by the user device. In some implementations, the recorded interaction may be maintained until the additional content item is retrieved and presented and then the interaction may be executed at the recorded position. For example, if the user select the "more" control 613 presented with the review 612, the selection and position of the selection may be recorded. When the additional content item is presented, as illustrated in FIG. 7, the recorded interaction may be executed at the recorded position. In this example, execution of the recorded interaction at the recorded position will result in a selection of the "more" link 713 (FIG. 7) on the web page presented as the additional content item. In such an example, the interaction would perform as if it were originally executed or input on the web page.

Figure 8:
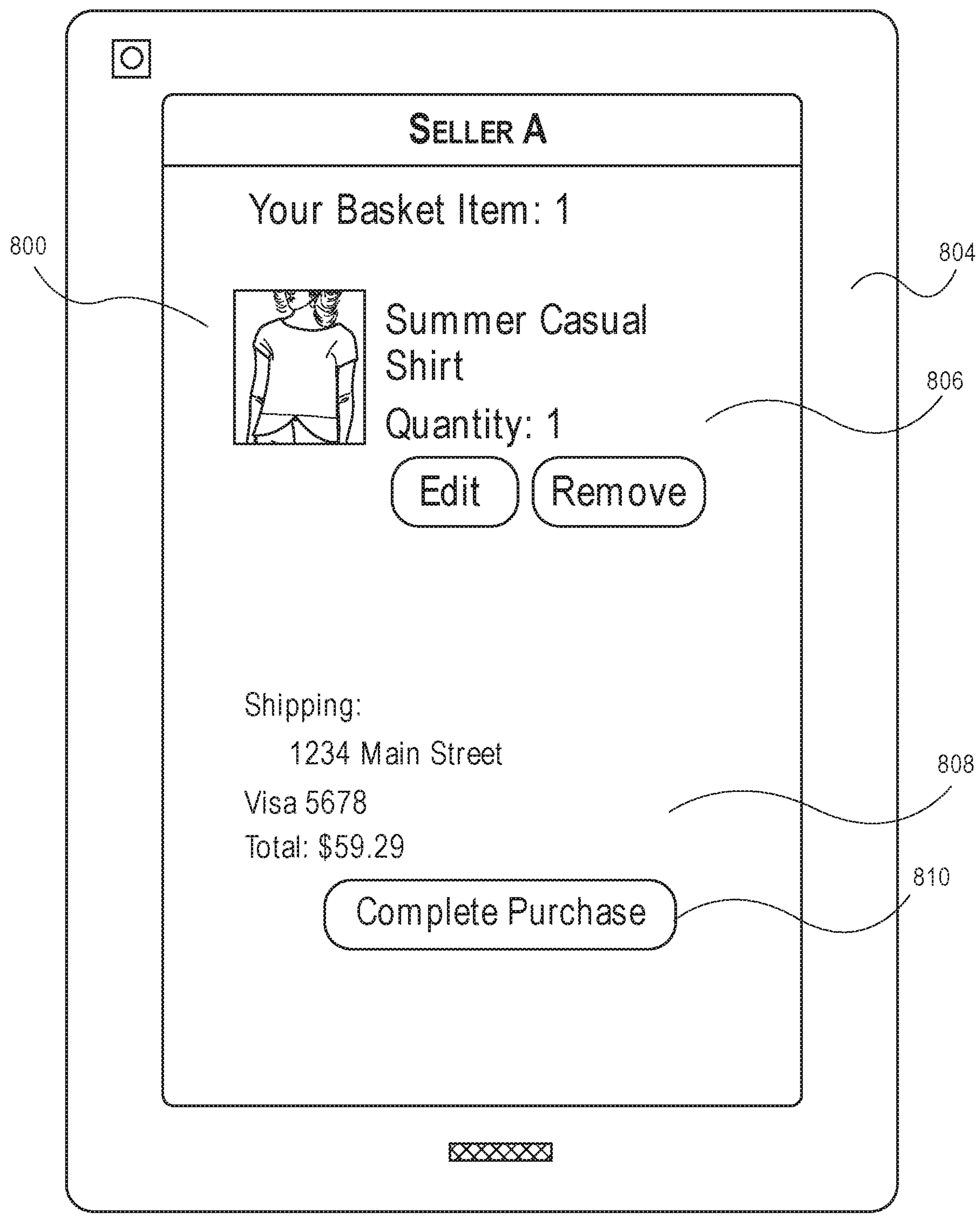
FIG. 8 is a representation of a checkout page, presented in response to a user interacting with a supplemental content item, in accordance with implementations of the present disclosure.

As another example, if the user interacts with the supplemental content item (FIG. 6) by selecting an object 616 that includes an associated action, rather than waiting for the additional content item to be received and presented, the associated action and/or the recorded interaction may be sent to the resource referenced in the content item. For example, if the user selects the object 616 that presents a "Buy Now" button, a purchase action may be associated with the position of the object on the supplemental content item. That action may be sent to the remote computing resource from which the additional content item is being retrieved. In response, the remote computing resource may send information related to the action that is presented to the user. For example, FIG. 8 is a presentation of a shopping cart or checkout web page presented on the display 800 of the user device 804 that is sent to the user device in response to the user selecting an object represented in the supplemental content item, in accordance with the implementations of the present disclosure. In this example, the shopping cart web page is updated to include the purchase request of the item in response to the user selecting the object "Buy Now" presented in the supplemental content item. In this example, the shopping cart may include an indication of the item 806, shipping information 808, and a complete purchase control 810. As is known, a user may interact with the shopping cart to edit, remove, purchase, etc.

Figure 9:
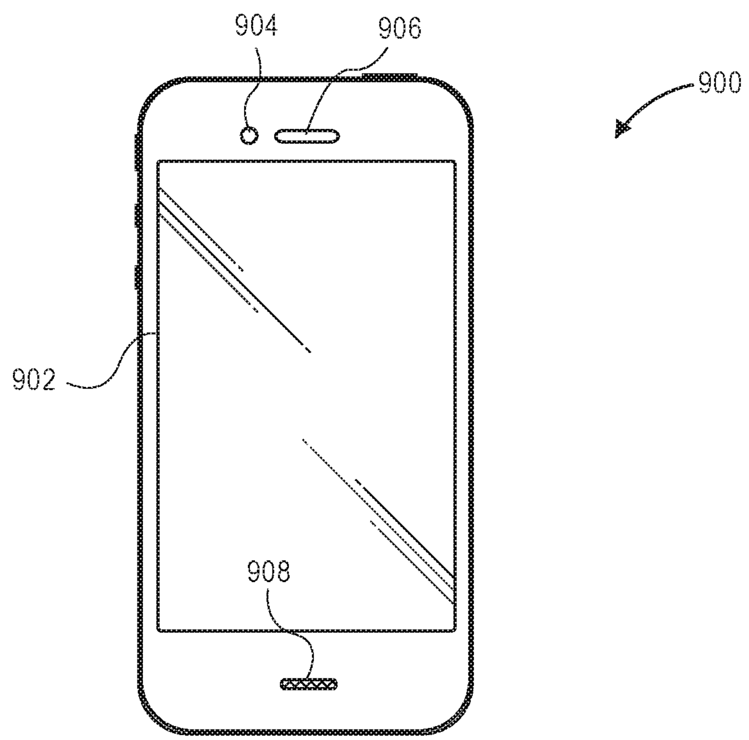
FIG. 9 illustrates an example computing device that can be used in accordance with implementations of the present disclosure.

FIG. 9 illustrates an example user device 900 that can be used in accordance with various implementations described herein. In this example, the user device 900 includes a display 902 and optionally at least one input component 904, such as a camera, on a same side of the device as the display 902. The user device 900 may also include an audio transducer, such as a speaker 906, and optionally a microphone 908. Generally, the user device 900 may have any form or input/output components that allow a user to interact with the user device 900. For example, the various input components for enabling user interaction with the device may include a touch-based display 902 (e.g., resistive, capacitive), camera (for gesture tracking, etc.), microphone, global positioning system (GPS), compass or any combination thereof. One or more of these input components may be included on a device or otherwise in communication with the device. Various other input components and combinations of input components can be used as well within the scope of the various implementations as should be apparent considering the teachings and suggestions contained herein.

Figure 10:
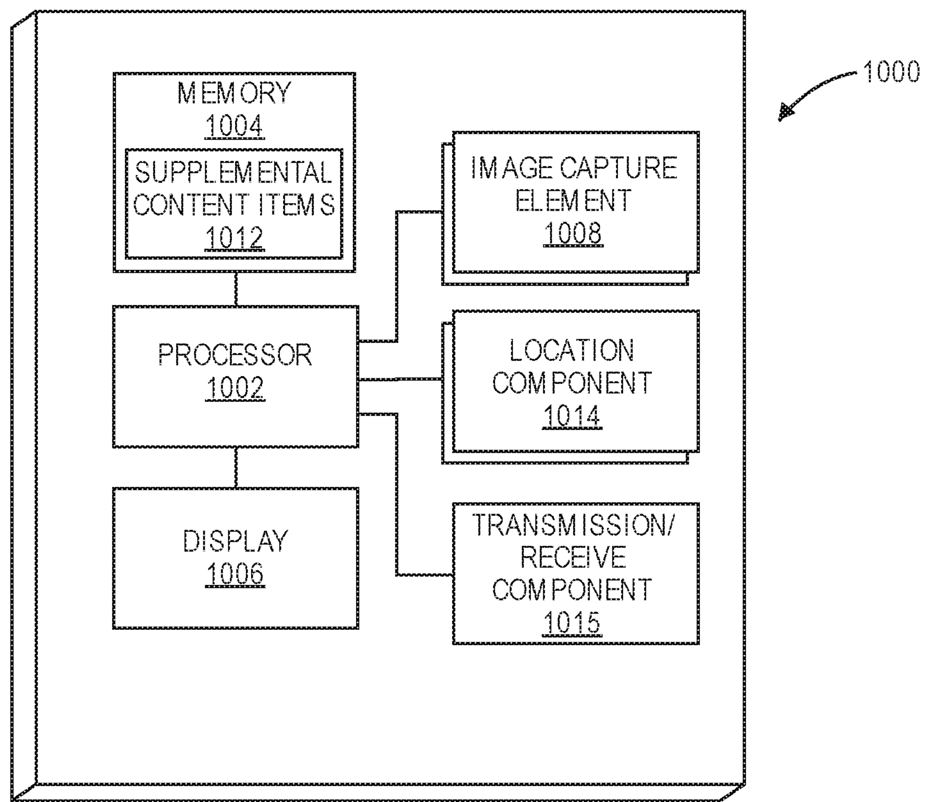
FIG. 10 illustrates an example configuration of components of a computing device, such as that illustrated in FIG. 9.

To provide the various functionality described herein, FIG. 10 illustrates an example set of basic components 1000 of a user device 900, such as the user device 900 described with respect to FIG. 9 and discussed herein. In this example, the device includes at least one central processor 1002 for executing instructions that can be stored in at least one memory device or element 1004. As would be apparent to one of ordinary skill in the art, the device can include many types of memory, data storage or computer-readable storage media, such as a first data storage for program instruction for execution by the processor 1002 and/or for storing supplemental content items 1012 that are associated with content items being displayed on the display of the user device. Removable storage memory can be available for sharing information with other devices, etc. The device typically will include some type of display 1006, such as a touch-based display, organic light emitting diode (OLED) or liquid crystal display (LCD).

As discussed, the device in many implementations will include at least one image capture element 1008, such as one or more cameras, that can image objects near the device. An image capture element can include, or be based at least in part upon, any appropriate technology, such as a CCD or CMOS image capture element having a determined resolution, focal range, viewable area, and capture rate.

The device also can include at least one location component 1014, such as GPS, NFC location tracking or Wi-Fi location monitoring. Location information obtained by the location component 1014 may be used with the various implementations discussed herein to identify the location of the user and/or the user device.

The device will also include at least one transmission/receive component 1015, such as a wireless radio for transmitting and/or receiving radio frequency communications. Alternatively, or in addition thereto, the device may be capable of communicating using other forms of wired and/or wireless communication so that the device can send content item requests, additional content item request, and/or receive content items, supplemental content items, and additional content items.

The example user device may also include at least one additional input device able to receive conventional input from a user. This conventional input can include, for example, a push button, touch pad, touch-based display, wheel, joystick, keyboard, mouse, trackball, keypad or any other such device or element whereby a user can input a command to the device. These I/O devices could be connected by a wireless, infrared, Bluetooth, or other link as well in some implementations.

Figure 11:
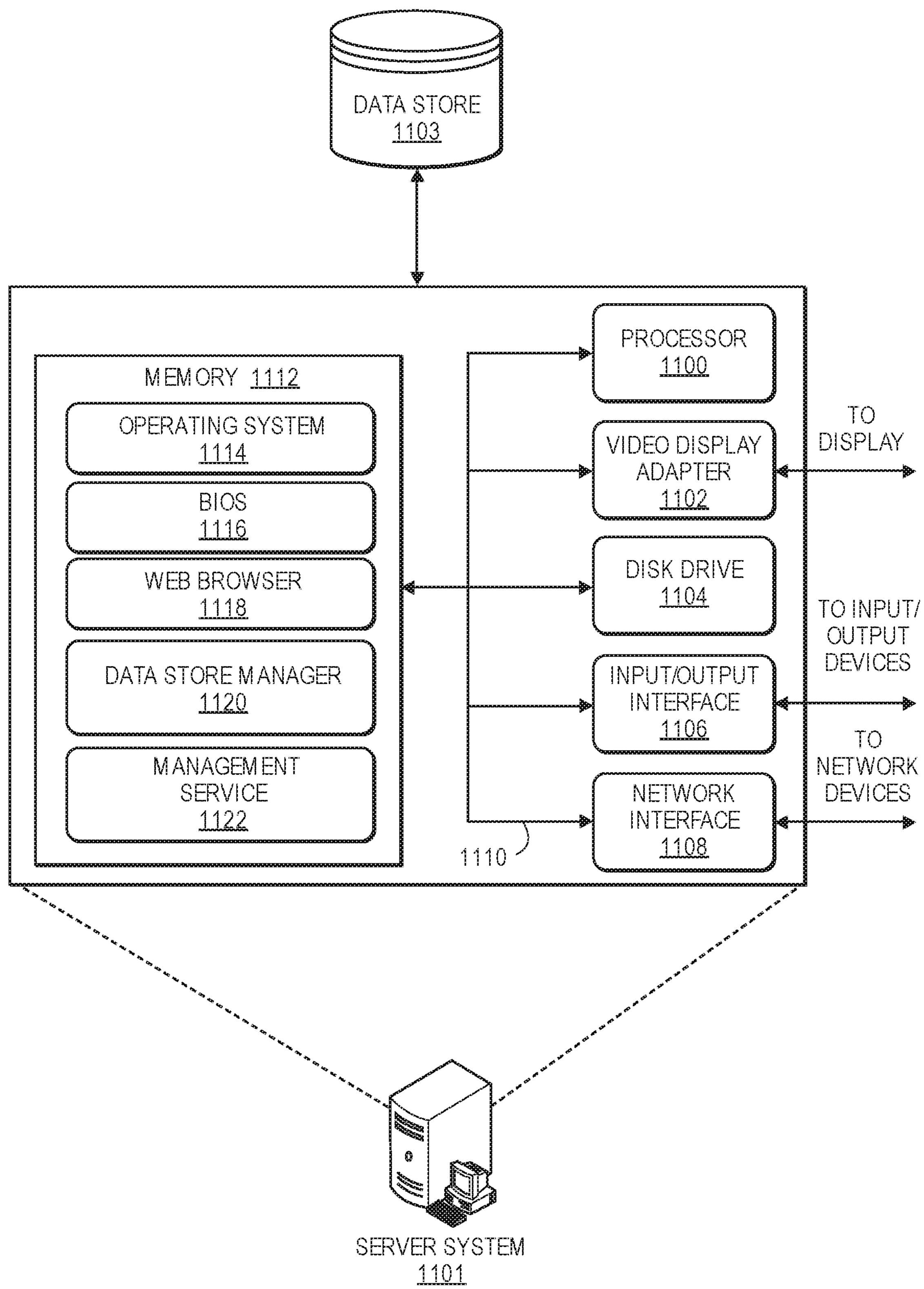
FIG. 11 is a pictorial diagram of an illustrative implementation of a server system that may be used for implementations of the present disclosure.

FIG. 11 is a pictorial diagram of an illustrative implementation of a server system, such as the server system 1101, that may be used with the implementations discussed herein. The server system 1101 may include a processor 1100, such as one or more redundant processors, a video display adapter 1102, a disk drive 1104, an input/output interface 1106, a network interface 1108, and a memory 1112. The processor 1100, the video display adapter 1102, the disk drive 1104, the input/output interface 1106, the network interface 1108, and the memory 1112 may be communicatively coupled to each other by a communication bus 1110.

The video display adapter 1102 provides display signals to a local display permitting an operator of the server system 1101 to monitor and configure operation of the server system 1101. The input/output interface 1106 likewise communicates with external input/output, such as a mouse, keyboard, scanner, or other input and output devices that can be operated by an operator of the server system 1101. The network interface 1108 includes hardware, software, or any combination thereof, to communicate with other computing devices. For example, the network interface 1108 may be configured to provide communications between the server system 1101 and other computing devices, such as the user device 900 (FIG. 9).

The memory 1112 generally comprises random access memory (RAM), read-only memory (ROM), flash memory, and/or other volatile or permanent memory. The memory 1112 is shown storing an operating system 1114 for controlling the operation of the server system 1101. A binary input/output system (BIOS) 1116 for controlling the low-level operation of the server system 1101 is also stored in the memory 1112.

The memory 1112 additionally stores program code and data for providing network services that allow user devices to exchange information and data files, such as content items, supplemental content items, and additional content items, with the server system 1101 and/or the management service 1122. Accordingly, the memory 1112 may store a browser application 1118. The browser application 1118 comprises computer executable instructions, that, when executed by the processor 1100, generate or otherwise obtain configurable markup documents such as Web pages. The browser application 1118 communicates with a data store manager application 1120 to facilitate data exchange and mapping between the data store 1103, and/or one or more user devices, such as the user device 900 shown in FIG. 9.

As used herein, the term “data store” refers to any device or combination of devices capable of storing, accessing and retrieving data, which may include any combination and number of data servers, databases, data storage devices and data storage media, in any standard, distributed or clustered environment. The server system 1101 can include any appropriate hardware and/or software for integrating with the data store 1103 as needed to execute aspects of one or more of the implementations discussed herein. The server system 1101 provides access control services in cooperation with the data stores 1103 and is able to generate content items, supplemental content items, and/or additional content items, as discussed herein.

The data store 1103 can include several separate data tables, databases or other data storage mechanisms and media for storing data relating to a particular aspect. For example, the data store 1103 illustrated includes mechanisms for storing content items, user information, supplemental content items, associations between content items and supplemental content items, etc.

It should be understood that there can be many other aspects that may be stored in the data store 1103. The data store 1103 is operable, through logic associated therewith, to receive instructions from the server system 1101 and obtain, update or otherwise process data in response thereto.

The memory 1112 may also include the management service 1122, discussed above. The management service 1122 may be executable by the processor 1100 to implement one or more of the functions of the server system 1101. In one implementation, the management service 1122 may represent instructions embodied in one or more software programs stored in the memory 1112. In another implementation, the management service 1122 can represent hardware, software instructions, or a combination thereof.

The server system 1101, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction in FIG. 11 should be taken as being illustrative in nature and not limiting to the scope of the disclosure.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 2-4, orders in which such methods or processes are presented are not intended to be construed as any limitation on the claims, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly," "instantly," or "substantially" as used herein, represent a value, amount, or characteristic close to the stated value, amount, or characteristic that still performs a desired function or achieves a desired result. For example, the terms "about," "approximately," "generally," "nearly," "instantly," or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A computer-implemented method, comprising:

maintaining in a data store, a segmented image that may be delivered to a user device for presentation to a user, the segmented image having a plurality of segments, each segment associated with a corresponding content item;

determining that the corresponding content item associated with one of the plurality of segments includes a reference to an additional content item that is requested and obtained from a remote computing resource upon interaction with the corresponding content item by the user when the segmented image is presented to the user on a display of the user device;

generating a plurality of supplemental content items related to the corresponding content item;

associating each of the plurality of supplemental content items with the corresponding content item, such that at least one of the supplemental content items will be presented on the display of the user device upon interaction by the user with the corresponding content item while the additional content item is requested and obtained from the remote computing resource;

storing the plurality of supplemental content items in the data store;

receiving, from the user device, a request for the corresponding content item; and in response to receiving the request:

randomly selecting a supplemental content item of the plurality of supplemental content items to send to the user device;

sending to the user device, the corresponding content item and the randomly selected supplemental content item such that:

the segmented image is presented on the display of the user device;

the randomly selected supplemental content item is stored in a memory of the user device; and the randomly selected supplemental content item is presented on the display of the user device in response to an interaction with the corresponding content item while the additional content item is requested and obtained by the user device from the remote computing resource, wherein each of the plurality of supplemental content items associated with the corresponding content item is updated at a predetermined periodic interval.

2. The computer-implemented method of claim 1, further comprising:

generating an image of the additional content item; and wherein at least one of the plurality of supplemental content items is the image of the additional content item.

3. The computer-implemented method of claim 1, further comprising:

determining a first frequency at which the additional content item changes;

determining a second frequency at which an image of the additional content item is to be generated, wherein the second frequency is determined based at least in part on the first frequency;

periodically generating, according to the second frequency, an image of the additional content item; and wherein at least one of the plurality of supplemental content items is the image of the additional content item.

4. The computer-implemented method of claim 1, further comprising:

generating an image of the corresponding content item; and wherein the image of the corresponding content item is at least one of the plurality of supplemental content items.

5. The computer-implemented method of claim 1, wherein at least one of the plurality of supplemental content items is an advertisement related to the corresponding content item or the additional content item.

6. The computer-implemented method of claim 1, wherein sending to the user device includes:

sending, to the user device, the segmented image, the randomly selected supplemental content item, and at least a second supplemental content item of the plurality of supplemental content items.

7. A non-transitory computer-readable storage medium storing instructions, the instructions when executed by a processor causing the processor to at least:

present, at a user device, a segmented image having a plurality of segments, each segment associated with a corresponding content item;

receive at the user device, a request for the corresponding content item;

send from the user device and to a first remote computing resource, a request for the corresponding content item;

receive, at the user device and from the first remote computing resource, the corresponding content item and a plurality of supplemental content items associated with the corresponding content item, wherein the corresponding content item includes a reference to an additional content item accessible from a second remote computing resource;

store in a memory of the user device, the plurality of supplemental content items;

present on a display of the user device, the segmented image;

receive at the user device, an interaction with the corresponding content item;

in response to the interaction:

randomly select a supplemental content item from the plurality of supplemental content items;

present on the display of the user device, the randomly selected supplemental content item; and send from the user device and to the second remote computing resource, a request for the additional content item;

receive at the user device and from the second remote computing resource, the additional content item; and replace, at the user device, the presentation of the randomly selected supplemental content item with a second presentation of the additional content item, wherein each of the plurality of supplemental content items associated with the corresponding content item is updated at a predetermined periodic interval.

8. The non-transitory computer-readable storage medium of claim 7, the instructions further causing the processor to at least:

present at the user device and with the randomly selected supplemental content item, an indicator indicating that the additional content item is being obtained.

9. The non-transitory computer-readable storage medium of claim 7, the instructions further causing the processor to at least:

receive, at the user device, a second interaction with the randomly selected supplemental content item;

record, at the user device, the second interaction and a position of the second interaction; and send, from the user device, the second interaction and the position of the second interaction to the second remote computing resource.

10. The non-transitory computer-readable storage medium of claim 9, the instructions further causing the processor to at least:

present on the display of the user device an indication that the second interaction was received; and provide at least one of an audible indicator or a tactile indicator as a confirmation that the second interaction was received.

11. The non-transitory computer-readable storage medium of claim 7, the instructions further causing the processor to at least:

receive at the user device, a second interaction with the randomly selected supplemental content item;

record, at the user device, the second interaction and a position of the second interaction; and subsequent to replacement of the presentation of the randomly selected supplemental content item with the second presentation of the additional content item, execute the interaction with respect to the additional content item.

12. The non-transitory computer-readable storage medium of claim 11, wherein the additional content item is a web page.

13. The non-transitory computer-readable storage medium of claim 12, wherein at least one of the plurality of supplemental content items is an image of the web page.

14. The non-transitory computer-readable storage medium of claim 7, wherein at least one of the plurality of supplemental content items is a video advertisement related to the additional content item.

15. The non-transitory computer-readable storage medium of claim 7, wherein at least one of the plurality of supplemental content items includes additional information relating to at least one of the corresponding content item or the additional content item.

16. The non-transitory computer-readable storage medium of claim 7, wherein the instructions when executed by the processor further cause the processor to at least:

in response to the interaction:

randomly select at least two supplemental content items from the plurality of supplemental content items; and present on the display of the user device, the randomly selected at least two supplemental content items.

17. A method, comprising:

presenting on a display of a user device, a segmented image having a plurality of segments, each segment associated with a corresponding content item;

storing in a memory of the user device, a plurality of supplemental content items;

receiving at the user device, an interaction with the corresponding content item;

in response to the interaction;

randomly selecting at least one of the plurality of supplemental content items;

presenting, on the display, the randomly selected at least one of the plurality of supplemental content items, such that the presentation of the randomly selected at least one of the plurality of supplemental content items replaces the presentation of the segmented image; and requesting from a remote computing resource, an additional content item;

receiving from the remote computing resource, the additional content item; and presenting on the display, the additional content item such that the additional content item replaces the presentation of the randomly selected at least one of the plurality of supplemental content items, wherein the plurality of supplemental content items is updated at a predetermined periodic interval.

18. The method of claim 17, further comprising:

receiving at the user device, a second interaction with the randomly selected at least one of the plurality of supplemental content items;

storing the second interaction and a position of the second interaction; and executing the second interaction with respect to the additional content item.

19. The method of claim 18, further comprising:

presenting on the display, an indication that the second interaction was received; and providing at least one of an audible indicator or a tactile indicator as a confirmation that the second interaction was received.

20. The method of claim 17, further comprising:

presenting on the display an indication that the additional content item is being obtained.

21. The method of claim 17, wherein at least one of the plurality of supplemental content items is at least one of, an image of the additional content item, an image of the corresponding content item, an advertisement related to the corresponding content item, or a video.

22. The method of claim 17, wherein the segmented image and at least one of the plurality of supplemental content items are obtained by the user device from a second remote computing resource that is different than the remote computing resource.

* * * * *